United States Patent
Lin et al.

(10) Patent No.: US 12,423,971 B1
(45) Date of Patent: Sep. 23, 2025

(54) METHODS FOR IDENTIFYING PINE WOOD NEMATODE-INFECTED DISCOLORED WOODS IN MIXED CONIFEROUS AND BROADLEAF FORESTS

(71) Applicant: NANJING FORESTRY UNIVERSITY, Jiangsu (CN)

(72) Inventors: Haifeng Lin, Nanjing (CN); Tao Chen, Nanjing (CN); Chengxuan Li, Nanjing (CN); Hongping Zhou, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 0 days.

(21) Appl. No.: 19/213,978

(22) Filed: May 20, 2025

(30) Foreign Application Priority Data

Jun. 7, 2024 (CN) .......................... 202410735437.3

(51) Int. Cl.
*G06V 20/10* (2022.01)
*G06V 10/72* (2022.01)
(Continued)

(52) U.S. Cl.
CPC ............ *G06V 20/188* (2022.01); *G06V 10/72* (2022.01); *G06V 10/7715* (2022.01); *G06V 10/82* (2022.01); *G06V 20/17* (2022.01)

(58) Field of Classification Search
CPC .. G06V 20/188; G06V 10/72; G06V 10/7715; G06V 10/82; G06V 20/17
See application file for complete search history.

(56) References Cited

U.S. PATENT DOCUMENTS

| 2018/0322327 A1* | 11/2018 | Smith | ............ G06V 20/698 |
| 2021/0027056 A1* | 1/2021 | Koch | ............ G06F 18/214 |
| 2024/0404235 A1* | 12/2024 | Lilaonitkul | ............ G06V 10/25 |

FOREIGN PATENT DOCUMENTS

| CN | 112258554 A | 1/2021 |
| CN | 114819052 A | 7/2022 |

(Continued)

OTHER PUBLICATIONS

Zhu et al. "Automatic Detection and Classification of Dead Nematode-Infested Pine Wood in Stages Based on YOLOv4 and GoogLeNet" (Year: 2023).*

(Continued)

*Primary Examiner* — Ming Y Hon
(74) *Attorney, Agent, or Firm* — PORUS IP LLC

(57) ABSTRACT

The present disclosure provides a method for identifying a pine wood nematode-infected discolored wood in a mixed coniferous and broadleaf forest, including inputting a pine forest image of the mixed coniferous and broadleaf forest to be identified into a trained identification model for the pine wood nematode-infected discolored wood to identify the pine wood nematode-infected discolored wood in the mixed coniferous and broadleaf forest, wherein the trained identification model is improved based on a you Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

7 Claims, 5 Drawing Sheets

(51) Int. Cl.
   *G06V 10/77*    (2022.01)
   *G06V 10/82*    (2022.01)
   *G06V 20/17*    (2022.01)

(56) References Cited

FOREIGN PATENT DOCUMENTS

| CN | 114841961 A   | 8/2022  |
|----|---------------|---------|
| CN | 115619719 A   | 1/2023  |
| CN | 116109859 A   | 5/2023  |
| CN | 117115682 A   | 11/2023 |
| WO | 2021203505 A1 | 10/2021 |

OTHER PUBLICATIONS

Miao et al. "Detection of Pine Wood Nematode Infestation Based on Improved YOLOv5" (Year: 2023).*
First Office Action in Chinese Application No. 202410735437.3 mailed on Nov. 22, 2024, 18 pages.
Notification to Grant Patent Right for Invention in Chinese Application No. 202410735437.3 mailed on Dec. 1, 2024, 5 pages.
Ding, Yuchuan, Recognition Technology of Pine Wood Affected by Pine Wilt Disease Based on YOLOv5. Outstanding Master's Thesis in China, 85 pages, 2024.
Xue, Zhenyang et al., YOLO-Tea: A Tea Disease Detection Model Improved by YOLOv5, Forests, 18 pages, 2023.
Wang, Shikuan et al., Detection of Pine Wilt Disease Using Drone Remote Sensing Imagery and Improved YOLOv8 Algorithm: A Case Study in Weihai, China, Forests, 22 pages, 2023.

* cited by examiner

METHODS FOR IDENTIFYING PINE WOOD NEMATODE-INFECTED DISCOLORED WOODS IN MIXED CONIFEROUS AND BROADLEAF FORESTS

CROSS-REFERENCE TO RELATED APPLICATIONS

This application claims priority to the Chinese Patent Application No. 202410735437.3, filed on Jun. 7, 2024, the contents of which are hereby incorporated by reference.

TECHNICAL FIELD

The present disclosure relates to the technical field of pine wood nematode-infected discolored wood detection, and in particular, to methods for identifying pine wood nematode-infected discolored woods in mixed coniferous and broadleaf forests.

BACKGROUND

Pine wood nematode disease, also known as pine wilt disease (PWD), is caused by the pine wood nematode, known as the "cancer of the pine tree", and is one of the most damaging diseases in global forest ecosystems. The PWD has highly destructive characteristics such as strong diffusion, destructiveness, and difficulty in prevention and control, and once infected, pine trees will die within a few months. It is evident that the PWD is not only fast spreading, wide range of impacts and extremely pathogenic. Therefore, an urgent need to develop rapid and highly accurate monitoring and diagnostic techniques to ensure accurate identification of the PWD and provide solid support for effective prevention and control measures.

However, a traditional manual inspection manner is costly, with a huge workload, a long time period, easy to miss, and difficult to comprehensively grasp a spatial distribution of infected trees in large areas of mountain forests, so that it may miss an optimal time to take preventive and curative measures, thus resulting in a rapid spread of the epidemic. In recent years, with the development of deep learning and drone close-range remote sensing technology, an identification of pine wood nematode-infected discolored woods has made significant progress. By combining deep learning algorithms and high-definition imagery from the drone, it is possible to rapidly identify discolored wood in forested areas, achieve early intervention, prevent the spread of the disease, and minimize a count of pine tree deaths. However, a complexity of forest environments increases a diversity of appearance characteristics of PWD targets, especially in mixed forests planted with a mixture of conifers and broadleaves, where foliage of different tree species are mixed together, increasing an image complexity of interpretation, which affects the accuracy of identifying the pine wood nematode-infected discolored woods. In addition, many scholars have devoted themselves to improving deep learning algorithms to enhance the accuracy of identifying the PWD, but these improvements lead to an increasing number of model parameters, which is difficult to be deployed on edge-end devices, such as drones, and restricts its application and popularization in real-world scenarios.

There is a need for a method that can accurately identify the pine wood nematode-infected discolored woods in complex mixed coniferous and broadleaf forest environments and can be deployed on edge-end devices such as drones.

SUMMARY

The purpose of the present disclosure is to overcome deficiencies in the prior art, and provide a method for identifying a pine wood nematode-infected discolored wood in a mixed coniferous and broadleaf forest, so as to solve problems of low accuracy of an identification model for the pine wood nematode-infected discolored wood in the mixed coniferous and broadleaf forest and difficulty of deploying the model with a large number of parameters on edge devices.

In order to solve the above technical problems, the present disclosure is realized using the following scheme:

The present disclosure provides a method for identifying a pine wood nematode-infected discolored wood in a mixed coniferous and broadleaf forest, comprising the following.

Inputting a pine forest image of the mixed coniferous and broadleaf forest to be identified into a trained identification model for the pine wood nematode-infected discolored wood to identify the pine wood nematode-infected discolored wood in the mixed coniferous and broadleaf forest.

Wherein the trained identification model is improved based on a You Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

A formula for the feature-filtering module is:

$$F' = (\sigma(Conv_1(\delta(Conv_1(\text{Maxpool}_c(F)))) + Conv_1(\delta(Conv_1(\text{Avgpool}_c(F)))))) \otimes F + (\sigma(Conv_3(\text{Concat}(\text{Maxpool}_s(F), \text{Avgpool}_s(F))))) \otimes F,$$

where F' is a feature map of fusion space and channel attention output by the feature-filtering module, F denotes a feature map input to the feature-filtering module, $\sigma$ is a Sigmoid activation function, $Conv_1$ is a 1×1 convolution operation, and $Conv_3$ is a 3×3 convolution operation, Concat is a splicing operation, $\delta$ denotes a Relu activation function, $\text{Avgpool}_c$ and $\text{Maxpool}_c$ are an average pooling operation and a maximum pooling operation along a channel dimension, $\text{Avgpool}_s$ and $\text{Maxpool}_s$ are respectively an average pooling operation and a maximum pooling operation along a spatial dimension, and $\otimes$ denotes element-by-element multiplication.

A formula for the feature-enhancing module is:

$$F_{out} = \delta(BN((y_1 + y_2 + y_3 + f))),$$
$$y_g = \delta(f + DConv(\delta(BN(Conv(f))), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, $\delta$ denotes a Relu activation function, j is the null rates corresponding to the plurality of branches and j=3,5,7, DConv denotes a null convolution operation, and k denotes a convolution kernel size.

A formula for the convolution-transformer module based on the MSHA is:

$$\text{MultiHead}(X) = \text{Concat}(Z_1, Z_2, Z_3, Z_4),$$

$$Z_i = \text{Softmax}\left(X_i W_i^Q (X_i W_i^K)^T + X_i W_i^Q (R_{wi} + R_{hi})^T\right) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q$, $W_i^K$, $W_i^V$ are linear transformation weight matrices of the each self-attention head, $R_{wi}$, $R_{hi}$ are positional encodings, Concat is the splicing operation, and i=1,2,3,4.

The present disclosure also provides a device for identifying a pine wood nematode-infected discolored wood in a mixed coniferous and broadleaf forest, comprising, an identification module.

The identification module is configured to input a pine forest image of the mixed coniferous and broadleaf forest to be identified into a trained identification model for the pine wood nematode-infected discolored wood to identify the pinewood nematode-infected discolored wood in the mixed coniferous and broadleaf forest.

Wherein the trained identification model is improved based on a you Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

A formula for the feature-filtering module is:

$$F' = (\sigma(Conv_1(\delta(Conv_1(\text{Maxpool}_c(F)))) + Conv_1(\delta(Conv_1(\text{Avgpool}_c(F))))))\otimes$$
$$F + (\sigma(Conv_3(\text{Concat}(\text{Maxpool}_s(F), \text{Avgpool}_s(F)))))\otimes F,$$

where F' is a feature map of fusion space and channel attention output by the feature-filtering module, F denotes a feature map input to the feature-filtering module, σ is a Sigmoid activation function, $Conv_1$ is a 1×1 convolution operation, and $Conv_3$ is a 3×3 convolution operation, Concat is a splicing operation, δ denotes a Relu activation function, $\text{Avgpool}_c$ and $\text{Maxpool}_c$ are an average pooling operation and a maximum pooling operation along a channel dimension, $\text{Avgpool}_s$ and $\text{Maxpool}_s$ are respectively an average pooling operation and a maximum pooling operation along a spatial dimension, and ⊗ denotes element-by-element multiplication.

A formula for the feature-enhancing module is:

$$F_{out} = \delta(BN((y_1 + y_2 + y_3 + f))),$$

-continued
$$y_g = \delta(f + DConv(\delta(BN(Conv(f))), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, δ denotes a Relu activation function, j is the null rates corresponding to the plurality of branches and j=3,5,7, DConv denotes a null convolution operation, and k denotes a convolution kernel size.

A formula for the convolution-transformer module based on the MSHA is:

$$\text{MultiHead}(X) = \text{Concat}(Z_1, Z_2, Z_3, Z_4)$$

$$Z_i = \text{Softmax}\left(X_i W_i^Q (X_i W_i^K)^T + X_i W_i^Q (R_{wi} + R_{hi})^T\right) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q$, $W_i^K$, $w_i^V$ are linear transformation weight matrices of the each self-attention head, $R_{wi}$, $R_{hi}$ are positional encodings, Concat is the splicing operation, and i=1,2,3,4.

The present disclosure further provides a non-transitory computer-readable storage medium storing a computer program, wherein when reading the computer program in the storage medium, a computer implements steps of the method for identifying a pine wood nematode-infected discolored wood in a mixed coniferous and broadleaf forest in the embodiments of the present disclosure.

BRIEF DESCRIPTION OF THE DRAWINGS

This disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
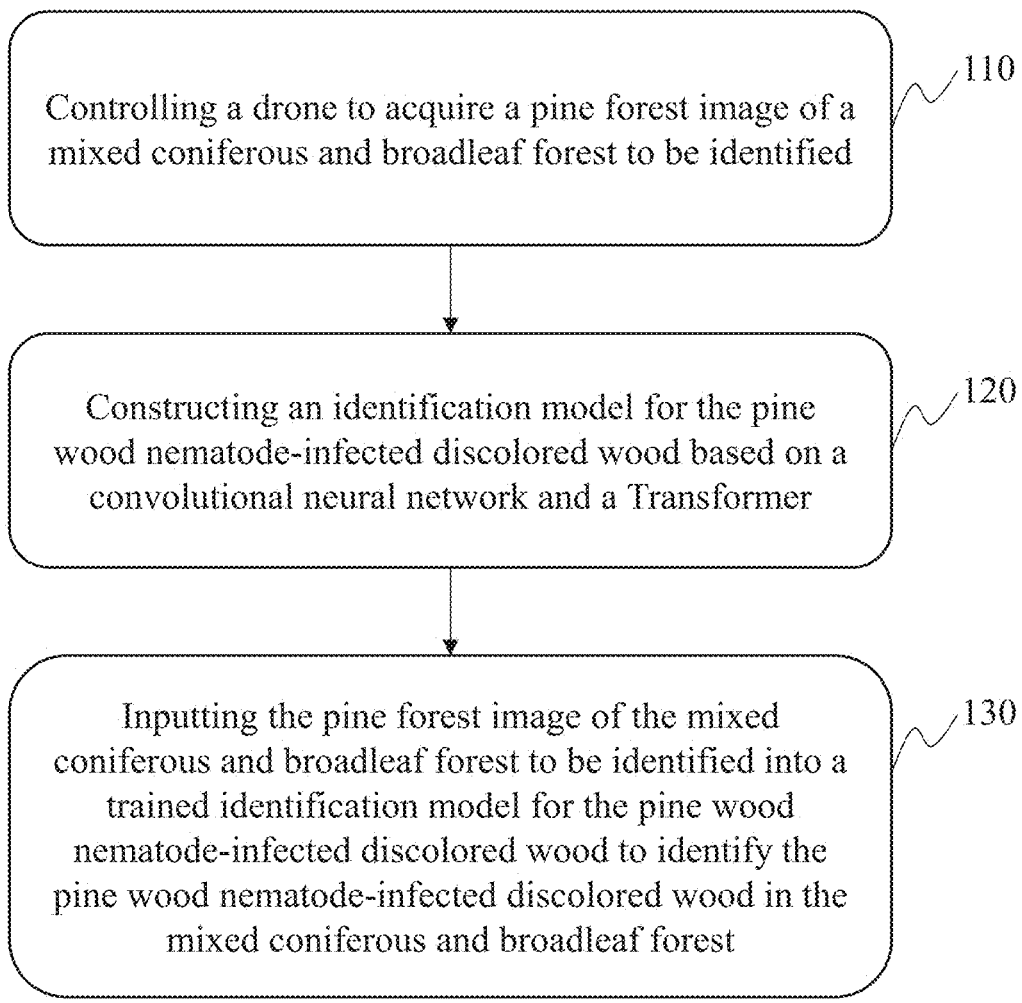
FIG. 1 is a flowchart illustrating a method for identifying a pine wood nematode-infected discolored wood in a mixed coniferous and broadleaf forest according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. The present disclosure can be applied to other similar scenarios based on these drawings without creative labor. Unless obviously obtained from the context or the context illustrates otherwise, the same numeral in the drawings refers to the same structure or operation.

It should be understood that as used herein, the terms "system", "device", "unit" and/or "module" as used herein is a way to distinguish between different components, elements, parts, sections or assemblies at different levels. However, said words may be replaced by other expressions if other words accomplish the same purpose.

Unless the context clearly suggests an exception, the words "one", "a", "an", and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or device may also include other steps or elements.

Flowcharts are used in this disclosure to illustrate operations performed by a system in accordance with embodiments of this disclosure. It should be appreciated that the preceding or following operations are not necessarily performed in an exact sequence. Instead, steps can be processed in reverse order or simultaneously. Also, it is possible to add other operations to these processes or remove a step or steps from them.

FIG. 1 is a flowchart illustrating a method for identifying a pine wood nematode-infected discolored wood in a mixed coniferous and broadleaf forest according to some embodiments of the present disclosure.

In some embodiments, as shown in FIG. 1, a process 100 includes the following steps.

Step 110, controlling a drone to acquire a pine forest image of a mixed coniferous and broadleaf forest to be identified.

Step 120, constructing an identification model for the pine wood nematode-infected discolored wood based on a convolutional neural network and a Transformer.

Figure 2:
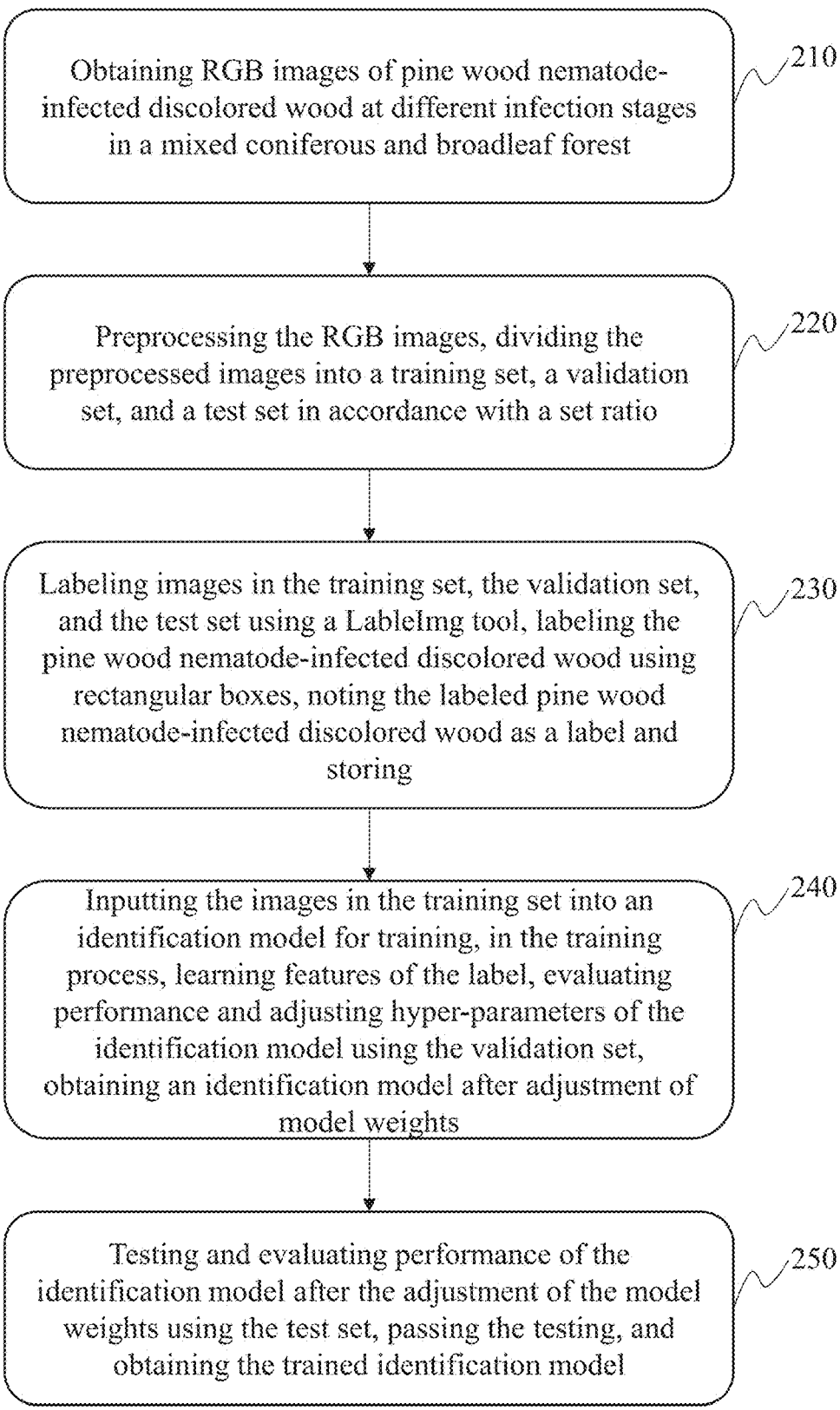
FIG. 2 is a flowchart illustrating building an image dataset of a pine wood nematode-infected discolored wood and constructing and training an identification model for the pine wood nematode-infected discolored wood according to some embodiments of the present disclosure.

More descriptions of step 110 and step 120 may be found in FIG. 2 and related descriptions thereof.

Step 130, inputting the pine forest image of the mixed coniferous and broadleaf forest to be identified into a trained identification model for the pine wood nematode-infected discolored wood to identify the pine wood nematode-infected discolored wood in the mixed coniferous and broadleaf forest.

The mixed coniferous and broadleaf forest refers to a forest with a mixture of coniferous and broadleaf trees.

The pine wood nematode-infected discolored wood refers to a pine tree that is discolored due to infection with pine wood nematode.

The pine forest image refers to an image that contains pine trees.

In some embodiments, the trained identification model is deployed on the drone or a forest area monitoring device, the drone is equipped with a visible light camera, the drone or the forest area monitoring device obtains the pine forest image of the mixed coniferous and broadleaf forest to be identified and inputs the pine forest image into the trained identification model to identify the pine wood nematode-infected discolored wood in the mixed coniferous and broadleaf forest.

The forest area monitoring device refers to a monitoring device set up in the mixed coniferous and broadleaf forest. The forest area monitoring device includes a camera, etc.

In some embodiments, a processor may control the drone to acquire the pine forest image of the mixed coniferous and broadleaf forest to be identified based on image acquisition parameters.

The image acquisition parameters refer to working parameters of the drone when acquiring the pine forest image. The image acquisition parameters include an image acquisition area, or the like.

In some embodiments, the image acquisition parameters may be preset based on historical experience.

In some embodiments, the processor may further determine an infectious feature based on a historical pine forest image in a preset historical time period; determine a focus acquisition area based on the infectious feature; and determine the image acquisition parameters based on the focus acquisition area.

In some embodiments, the processor may obtain the historical pine forest image in the preset historical time period based on historical data. The preset historical time period may be a time period (e.g., a week, a month, etc.) prior to the current moment.

The infectious feature refers to a feature associated with an infection of the pine wood nematode. The infectious features include a source, a direction, a rate, or the like of the infection.

In some embodiments, the processor may determine the infectious feature based on the historical pine forest image. For example, the processor may determine the earliest pine wood nematode-infected discolored wood as the source of the infection, determine a direction of new pine wood nematode-infected discolored wood around the source of the infection as the direction of the infection, and calculate a count of new pine wood nematode-infected discolored woods to obtain the rate of the infection.

The focus acquisition area refers to an area where more pine forest images need to be acquired. In some embodiments, the processor may determine one or more areas that are likely to be infected with the pine wood nematode in a future time period as the focus acquisition area based on the direction and the rate of the infection.

In some embodiments, the processor may determine the focus acquisition area as the image acquisition area.

In some embodiments of the present disclosure, by identifying the infectious feature of the pine wood nematode-infected discolored wood in the mixed coniferous and broadleaf forest, and by focusing the monitoring on the area that is about to be infected according to the infectious feature, it is possible to identify discolored woods at an infection early stage as early as possible, which is beneficial for subsequent prevention and governance.

In some embodiments, the image acquisition parameters further include a sampling density. The processor may determine the sampling density based on an infection stage.

The sampling density is a count of pine forest images acquired per unit of space.

The infection stage refers to the current stage of the pine wood nematode-infected discolored wood. The infection stage includes the infection early stage, an infection middle stage, and an infection later stage.

In some embodiments, for an image acquisition area, a technician may determine the infection stage of each pine tree in the image acquisition area based on the last acquired pine forest image, and the processor may calculate an average infection stage, with the later the average infection stage, the smaller the sampling density.

The later the infection stage is, the more pronounced the color change of the pine tree is, and by reducing the sampling density, an energy consumption of the drone as well as an amount of data processed by the drone can be reduced.

In some embodiments, in response to a presence of haze at a time of acquiring the pine forest image of the mixed coniferous and broadleaf forest to be identified, the processor may, based on a preset threshold, determine a texture blurring area in the pine forest image of the mixed coniferous and broadleaf forest to be identified; and perform a texture repair on the texture blurring area by a preprocessing model to obtain the pine forest image of the mixed coniferous and broadleaf forest to be identified.

In some embodiments, the processor may obtain weather conditions at a location where the mixed coniferous and broadleaf forest is located via the Internet, and thereby determining whether haze is present at the time of acquiring the pine forest image of the mixed coniferous and broadleaf forest to be identified.

The texture blurring area refers to a part of the pine forest image where the texture is blurred.

In some embodiments, the processor may divide the pine forest image into a plurality of sub-areas, and for each of the sub-areas, in response to the sub-area having a texture blurring index that is greater than a preset threshold, the processor determines the sub-area as the texture blurring area.

The texture blurring index refers to a parameter used to measure a degree of texture blurring. In some embodiments, the processor may calculate an image gradient in each sub-area using, for example, a Sobel operator or a Laplace operator, and thereby calculating a mean or a variance of the gradients, with the lower the mean and the lower the variance of the gradients, the blurrier the image in the sub-area, and the larger the texture blurring index.

In some embodiments, different sub-areas correspond to different preset thresholds, and the greater a leaf density in the sub-area, the smaller the preset threshold.

The leaf density refers to a count of leaves per unit space. In some embodiments, the technician may calculate a Normalized Difference Vegetation Index (NVDI) corresponding to each sub-area based on the most recent image of the pine forest image without haze at the current moment, estimate the leaf density based on the NVDI, and the greater the NVDI, the greater the leaf density.

The preprocessing model is s model used for texture repair of the texture blurring area. In some embodiments, the preprocessing model is a machine learning model, e.g., the preprocessing model may be a Neural Network (NN) model or other user-defined model, etc. or any combination thereof.

An input of the preprocessing model includes a pine forest image with the texture blurring area, and an output of the preprocessing model includes the pine forest image of the mixed coniferous and broadleaf forest to be identified.

In some embodiments, the processor may train to obtain the preprocessing model based on a plurality of first training samples with first labels. The processor may input the first training samples into an initial preprocessing model, construct a loss function based on outputs of the initial preprocessing model and the first labels, iteratively update parameters of the initial preprocessing model based on the loss function, and, when an iteration end condition is met, end the iteration, and obtain the trained preprocessing model. A manner of iteratively updating includes, but is not limited to, a gradient descent method, and the iteration end condition may be that the loss function converges or a count of iterations reaches a threshold.

In some embodiments, the technician may separately acquire pine forest images in the same image acquisition area in a presence of haze and in an absence of haze, and determine the pine forest image in the presence of haze as the first training sample, and the pine forest image in the absence of haze as the first label corresponding to the first training sample.

Areas with high leaf density have low light penetration, more significant scattering effect of fog, and high complexity of natural texture, so the blurring caused by the haze is more serious, and the preset threshold needs to be lowered to trigger the texture repair earlier; whereas, for areas with low leaf density, the preset threshold needs to be appropriately raised to avoid over-processing clear areas. This allows for more targeted texture repair and improves overall image quality.

In some embodiments, the image acquisition parameters further include an acquisition height, and the processor may control the drone to acquire a coarse pine forest image of the mixed coniferous and broadleaf forest to be identified based on preset coarse acquisition parameters; determine a tree feature based on the coarse pine forest image; and determine the image acquisition parameters based on the tree feature.

The acquisition height refers to an altitude at which the drone flew when acquiring the pine forest image.

The preset coarse acquisition parameters refer to preset image acquisition parameters that are used when the drone initially acquires the pine forest image. The preset coarse acquisition parameters may be set based on historical experience.

The coarse pine forest image refers to a pine forest image obtained from preliminary acquisition.

In some embodiments, the drone may acquire the pine forest image of the mixed coniferous and broadleaf forest to be identified based on the preset coarse acquisition parameters to obtain the coarse pine forest image.

The tree feature refers to a feature associated with trees in the mixed coniferous and broadleaf forest to be identified. The tree feature includes a tree height, a canopy volume, or the like.

In some embodiments, the processor may determine the tree feature based on the coarse pine forest image by means of a tree feature determination model.

The tree feature determination model is a model used to determine the tree feature. In some embodiments, the tree feature determination model is a machine learning model, e.g., the tree feature determination model may be a neural network (NN) model or other user-defined model, etc. or any combination thereof.

An input of the tree feature model includes the coarse pine forest image, and an output of the tree feature model includes the tree feature.

In some embodiments, the processor may train to obtain the tree feature determination model based on a plurality of second training samples with second labels by the same way as for training the preprocessing model.

The second training sample includes a sample pine forest image, and the second training sample may be obtained based on historical data. The second label is a tree feature corresponding to the sample pine forest image, and the second label may be obtained by the technician by performing an actual measurement in an image acquisition area corresponding to the sample pine forest image.

In some embodiments, the processor may determine the image acquisition parameters based on the tree feature. For example, the processor may query a first preset table to determine the acquisition height based on the tree feature.

The first preset table includes a correspondence between the tree feature and the acquisition height. In some embodiments, for a tree feature, the technician may experimentally acquire pine forest images corresponding to the tree feature at different acquisition heights, respectively, and the acquisition height corresponding to the pine forest image with the highest image quality is determined as the acquisition height corresponding to the tree feature.

In some embodiments, the image quality may be manually determined by the technician. In some other embodiments, the technician may input the pine forest image into the trained identification model for the pine wood nematode-infected discolored wood, identify the pine wood nematode-infected discolored wood in the pine forest image, and based on a comparison of the model identification results with an actual situation, an accuracy rate of the model identification is obtained, and the higher the accuracy rate, the higher the image quality.

In the embodiments of the present disclosure, through rough acquisition, a general situation of the entire mixed coniferous and broadleaf forest can be obtained, so as to formulate a targeted acquisition plan, and can effectively improve the quality of the pine forest image, so as to improve the accuracy of model identification.

The identification model for the pine wood nematode-infected discolored wood is a model used to identify the pine wood nematode-infected discolored wood in the pine forest image.

An input of the identification model for the pine wood nematode-infected discolored wood includes the pine forest image, and an output of the identification model for the pine wood nematode-infected discolored wood includes the pine wood nematode-infected discolored wood in the mixed coniferous and broadleaf forest.

In some embodiments, the identification model for the pine wood nematode-infected discolored wood is improved based on a you Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

More descriptions of construction and training processes of the identification model for the pine wood nematode-infected discolored wood may be found in the following FIG. 2 and the related descriptions.

In some embodiments, the processor may determine spraying parameters based on the pine wood nematode-infected discolored wood in the mixed coniferous and broadleaf forest; and control the drone to carry out a drug spraying operation in the mixed coniferous and broadleaf forest based on the spraying parameters The spraying parameters refers to parameters related to the drug spraying operation by the drone. For example, the spraying parameters include a spraying area, or the like.

In some embodiments, the processor may identify the image acquisition area where the pine wood nematode-infected discolored wood is present as the spraying area.

FIG. 2 is a flowchart illustrating building an image dataset of a pine wood nematode-infected discolored wood and constructing and training an identification model for the pine wood nematode-infected discolored wood according to some embodiments of the present disclosure.

As shown in FIG. 2, a process 200 includes the following steps.

Step 210, obtaining RGB images of pine wood nematode-infected discolored wood at different infection stages in a mixed coniferous and broadleaf forest.

In some embodiments, a processor may control a drone to acquire the RGB images of pine wood nematode-infected discolored wood at different infection stages. Preferably, the RGB images primarily include images of the pine wood nematode-infected discolored wood at an infection early stage and an infection middle stage.

Figure 3:
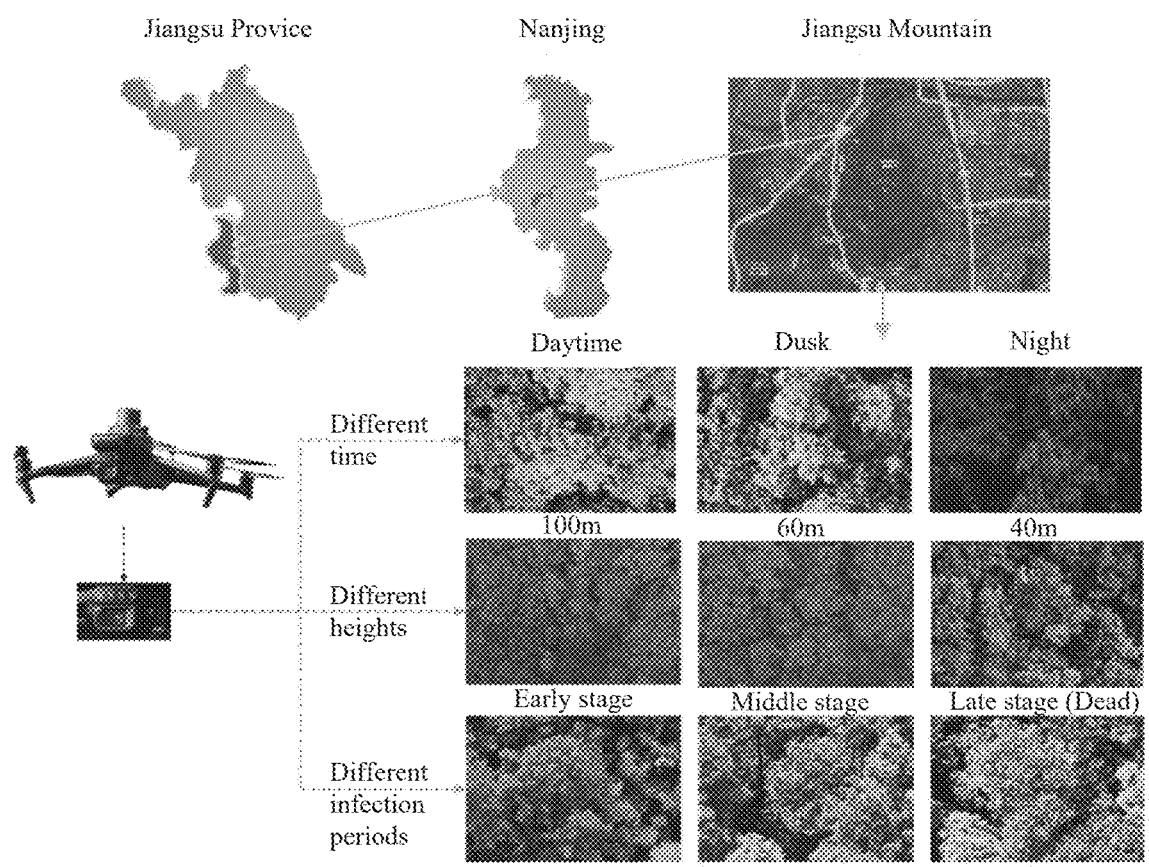
FIG. 3 is a schematic diagram illustrating collecting data during a training process of an identification model for a pine wood nematode-infected discolored wood according to some embodiments of the present disclosure.

FIG. 3 is a schematic diagram illustrating collecting data during a training process of an identification model for a pine wood nematode-infected discolored wood according to some embodiments of the present disclosure.

As shown in FIG. 3, a processor may control a drone equipped with a visible light camera to acquire pine forest images of a mixed coniferous and broadleaf forest during daytime, evening, and darkness hours at the General Mountain Scenic Area in Yuhuatai District, Nanjing City, Jiangsu Province, China (31° 95'67" to 31° 91'18 "N, 118° 75'77" to 118° 79'03"), respectively.

The data acquisition process described in FIG. 3 is only an embodiment of the present disclosure, and the processor may also control the drone to take pine forest images of mixed coniferous and broadleaf forest at any location at any time for data acquisition in the training process.

Step 220, preprocessing the RGB images and dividing the preprocessed images into a training set, a validation set, and a test set in accordance with a set ratio.

The preprocessing includes, but is not limited to, filtering the RGB images, removing blurred and distorted RGB images, or the like.

In some embodiments, the processor may divide the preprocessed images into a training set TRAIN, a validation set VAL, and a test set TEST in accordance with the set ratio, the training set is used to train the model, the validation set is used to evaluate the model accuracy and other performance during training and to monitor the model training, the test set is used for a final performance assessment after the model training is completed, preferably, the set ratio is 8:1:1 or the like.

In some embodiments, the processor may divide the training set and the test set based on the infection stage, wherein a learning rate for each batch of samples correlates to resolutions of the RGB images in the sample.

In some embodiments, the processor may divide the RGB images into a plurality of databases based on the infection stage, and extract a corresponding proportion of the RGB images from different databases in accordance with the set ratio, respectively, to obtain the training set and the test set. For example, if the processor divides the RGB images at the infection early stage into an early stage database, and the RGB images at the infection middle stage into a middle stage database, the processor extracts a corresponding proportion of RGB images from the early database in accordance with the set ratio and divides them into the training set and the test set, respectively. Similarly, the processor extracts a corresponding proportion of RGB images from the middle database in accordance with the set ratio and divides them into the training set and the test set, respectively, and the training set and the test set are obtained.

In some embodiments, the processor may also adjust a ratio of RGB images from different databases in the training set and the test set based on an objective of the identification model for the pine wood nematode-infected discolored wood. For example, when the identification model for the pine wood nematode-infected discolored wood is primarily used to identify pine wood nematode-infected discolored wood at the infection early stage, there is a greater percentage of RGB images from the early stage database in the training set and the test set.

The learning rate is used to control an update magnitude of the model parameters during training. The larger the learning rate, the larger the update magnitude. The learning rate is negatively correlated to the current iteration round.

In some embodiments, the learning rate for each batch of samples is negatively correlated to the resolution of the RGB images in the sample.

In the embodiments of the present disclosure, dividing the training set and the test set based on the infection stage are capable of generating the training set and the test set targeted to different objectives. This makes the model have better identification accuracy for pine wood nematode-infected discolored woods at a specific infection stage. High-resolution images usually contain more details and information, and by adjusting the learning rate based on the resolutions of the RGB images, overfitting or learning irrelevant details can be avoided.

In some embodiments, the learning rate is also correlated to the image acquisition parameters. Specifically, the learning rate is positively related to the acquisition density.

Step 230, labeling images in the training set, the validation set, and the test set using a LableImg tool, labeling the pine wood nematode-infected discolored wood using rectangular boxes, noting the labeled pine wood nematode-infected discolored wood as a label and storing.

The LableImg tool is an image labelling tool that may be used by a technician to annotate objects in an image and generate the corresponding label file.

For example, the technician may choose a label name PWD and store the label in the ".XML" file format. The identification model for the pine wood nematode-infected discolored wood may learn features of a PWD target after a plurality of rounds of learning (i.e., training) based on labels so that the PWD target may be accurately identified and a corresponding rectangular box may be generated to frame out an infested area.

Figure 4:
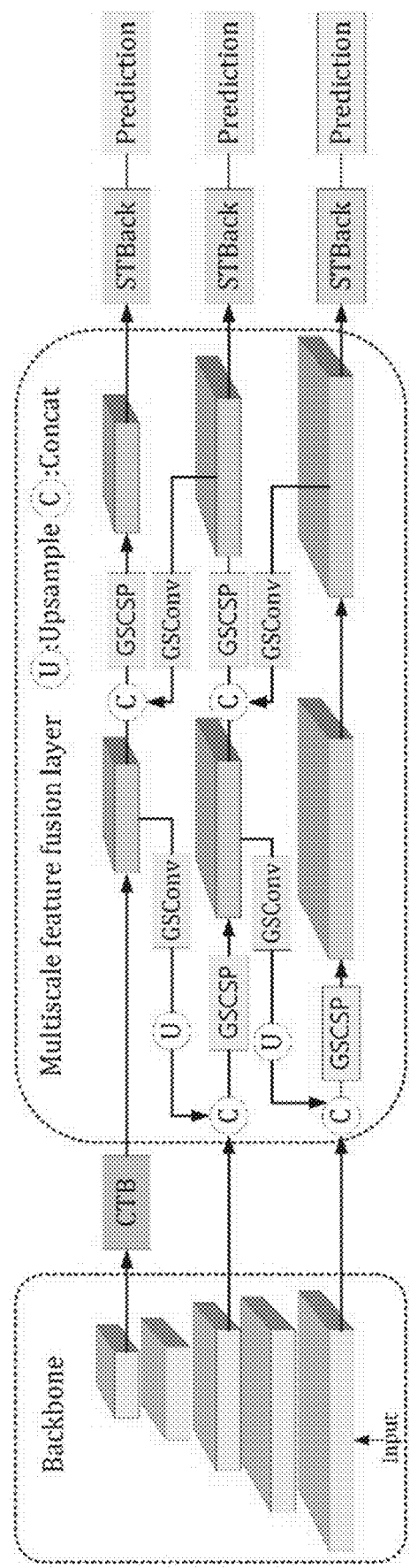
FIG. 4 is a schematic diagram illustrating a structure of an identification model for a pine wood nematode-infected discolored wood according to some embodiments of the present disclosure.

FIG. 4 is a schematic diagram illustrating a structure of an identification model for a pine wood nematode-infected discolored wood according to some embodiments of the present disclosure.

As shown in FIG. 4, constructing the identification model for the pine wood nematode-infected discolored wood based on a convolutional neural network and a Transformer includes the following steps.

S1, based on the YOLOv5s model architecture, the present disclosure designs a feature-filtering module STBack, which is connected after a Neck, to filter an interference of ineffective background information of a forested area, and improving robustness of the model.

S2, on the basis of S1, the present disclosure constructs a feature-enhancing module FEM, which replaces a C3 module in a Backbone, to enhance the model's ability of identifying early small and dense targets of pine wood nematode.

S3, on the basis of S2, the present disclosure constructs a convolution-transformer module CTB based on multi-head self-attention (MSHA), connected after the Backbone for improving the model's ability of identifying occluded pine wood nematode-infected discolored wood targets.

S4, on the basis of S3, the present disclosure introduces GSConv to construct a multi-scale feature fusion layer to replace an ordinary convolution in the Neck, in order to reduce a computational complexity of the model, and to facilitate a realization of the model's deployment and application.

Step 240, inputting the images in the training set into an identification model for training, in the training process, learning features of the label, evaluating performance and adjusting hyper-parameters of the identification model using the validation set, obtaining an identification model after adjustment of model weights.

In some embodiments, the processor uses the validation set for performance evaluation during model training, and each round of training outputs evaluation metrics for adjusting hyper-parameters, and the trained model weights are saved as a "best.pt" file.

Step 250, testing and evaluating performance of the identification model after the adjustment of the model weights using the test set, passing the testing, and obtaining the trained identification model.

In some embodiments, the processor inputs images in the test set into the "best.pt" file as the model weights, and tests and evaluates the performance of the identification model for the pine wood nematode-infected discolored wood, and if the test passes, i.e., a test result (a recognition result of the output) meets an expected requirements, the trained identification model for the pine wood nematode-infected discolored wood is obtained, otherwise, the processor performs step 240.

In step S1, channel and spatial dimensions of a feature map are processed in parallel, and attentional weights on each dimension are accurately computed to realize fine filtering of features.

In the channel dimension, the feature-filtering module first extracts spatial information of an input feature map through a maximum pooling operation and an average pooling operation, respectively, to generate two different pooling feature maps. Subsequently, these two pooling feature maps are processed by convolution operation, ReLU activation function, and convolution operation again, respectively, to learn inter-channel dependencies and generate corresponding feature representations. Next, these two feature representations are summed and normalized by a sigmoid function weight to obtain the final channel attention weight vector as follows.

$$W_c(F) = \sigma(Conv_1(\delta(Conv_1(Maxpool_c((F)))))+Conv_1(\delta(Conv_1(Avgpool_c(F)))))),$$

where F denotes a feature map input to the feature-filtering module, $\sigma$ is a Sigmoid activation function, $Conv_1$ is a 1×1 convolution operation, $\delta$ denotes the ReLu activation function, $Avgpool_c$ and $Maxpool_c$ are the average pooling operation and the maximum pooling operation along the channel dimension. Finally, the channel attention weight vector is multiplied channel-by-channel with an original feature map to obtain $F'_c$, which is computed as follows:

$$F'_c = W_c(F) \otimes F,$$

where $\otimes$ denotes element-by-element multiplication.

In the spatial dimension, the module first performs the maximum pooling operation and the average pooling operation on the feature map F. These two pooling operations extract a maximum response and an average response in the feature map, respectively, thus obtaining two pooling feature maps containing different spatial information. Next, these two pooling feature maps are concatenated in the channel dimension to form a feature map that incorporates maximum pooling information and average pooling information. The pooling feature map is then transformed by a convolutional layer to learn a spatial weight vector, which has a corresponding value at each spatial location, reflecting an importance of the location in a detection task. Finally, a weight vector w is obtained by normalizing the weight vector to 0-1 by the sigmoid function, which is calculated as follows:

$$W_s(F)=\sigma(Conv_3(Concat(Maxpool_s(F),Avgpool_s(F)))),$$

where F denotes the feature map input to the feature-filtering module, σ is the Sigmoid activation function, $Conv_3$ is the 3×3 convolution operation, Concat is a splicing operation, $Avgpool_s$ and $Maxpool_s$ are the average pooling operation and the maximum pooling operation along the spatial dimension. A spatial weight vector $W_s(F)$ is multiplied element-by-element with the original feature map F to generate a weighted feature map as follows:

$$F'_s = W_s(F) \otimes F.$$

Finally, these two weighted feature maps are summed element-by-element to obtain a final feature map that incorporates both spatial and channel attention as follows:

$$F' = F'_c + F'_s.$$

That is, $$F' = \\ (\sigma(Conv_1(\delta(Conv_1(Maxpool_c(F)))) + Conv_1(\delta(Conv_1(Avgpool_c(F)))))) \otimes \\ F + (\sigma(Conv_3(Concat(Maxpool_s(F), Avgpool_s(F))))) \otimes F,$$

where F' is the feature map of fusion space and channel attention output by the feature-filtering module, F denotes the feature map input to the feature-filtering module, σ is the Sigmoid activation function, $Conv_1$ is the 1×1 convolution operation, and $Conv_3$ is the 3×3 convolution operation, Concat is the splicing operation, δ denotes the ReLu activation function, $Avgpool_c$ and $Maxpool_c$ are respectively the average pooling operation and the maximum pooling operation along the channel dimension, $Avgpool_s$ and $Maxpool_s$ are the average pooling operation and the maximum pooling operation along the spatial dimension, and ⊗ denotes element-by-element multiplication In step S2, the feature-enhancing module is constructed to replace the C3 module in the Backbone. This module has three parallel branches that perform convolution, BN normalization, and ReLU nonlinear activation operations on the input feature map. Subsequently, a null convolution operation (with null rates of 3, 5, and 7) is performed on the feature map, which are normalized and summed with the original feature map. Depending on properties of the null convolution, each branch expands the previous layer's receptive field $R_{n-1}$ as follows:

$$R_n = R_{n-1} + (k-1) \times d_n,$$

where $R_n$ denotes a size of receptive field of the current layer, $R_{n-1}$ denotes a size of receptive field of the previous layer, $d_n$ denotes the nth layer's null rate, and a convolution kernel size is k×k.

A formula for the feature-enhancing module is:

$$F_{out} = \delta(BN((y_1 + y_2 + y_3 + f))),$$

where $F_{out}$ is a feature map output by the feature-enhancing module, f is a feature map input to the feature-enhancing module, $y_1$, $y_2$, $y_3$ are three null convolution outputs with different null rates, respectively, and BN is a Batch Norm Normalization operation, δ denotes the ReLu activation function. $y_1$, $y_2$, and $y_3$ can be refined as follows:

$$f_g = \delta(BN(Conv(f))),$$

$$y_g = \delta(f + DConv(f_g, j, k)).$$

That is, $$y_g = \delta(f + DConv(\delta(BN(Conv(f))), j, k)),$$

where $f_g$ denotes the input feature map after convolution, normalization, and activation, j is the null rate corresponding to the plurality of branches and j=3,5,7, DConv denotes the null convolution operation on $f_g$, k denotes the convolution kernel size, g=1,2,3.

Step S3 introduces the multi-head self-attention in the last layer of residual units in the Backbone, splits an input feature X into four parts ($X_i$, i=1,2,3,4), which are fed into four identical self-attention heads (Self-Attention_1 to Self-Attention_4). The self-attention heads are calculated as follows:

$$Q_i = X_i W_i^Q,$$

$$K_i = X_i W_i^K,$$

$$V_i = X_i W_i^V,$$

where $W_i^Q$, $W_i^K$, $W_i^V$ are linear transformation weight matrices for each self-attention head, and $Q_i$, $K_i$, $V_i$ are query, key, and value matrices for each head i (i=1,2,3,4).

$$\text{Attention}_i^1 = Q_i K_i^T,$$

$$\text{Attention}_i^2 = Q_i R_i^T,$$

$$R_i = R_{wi} + R_{hi},$$

where $\text{Attention}_i^1$ is a self-attention score between features, $\text{Attention}_i^2$ is a self-attention score between features and locations. $R_{wi}$, $R_{hi}$ are locations codings. The self-attention score for each self-attention head is then computed by a Softmax function as follows:

$$\text{Attention}_i = Softmax(Q_i K_i^T + Q_i R_i^T).$$

A final output of each self-attention head is $Z_i$, and the outputs of the four self-attention heads are subjected to the Concat operation to obtain a formula for the convolution-transformer module based on the MSHA which is calculated as follows:

$$MultiHead(X) = Concat(Z_1, Z_2, Z_3, Z_4),$$

$$Z_i = \text{Attention}_i V_i.$$

That is, $$Z_i = \text{Softmax}(X_i W_i^Q (X_i W_i^K)^T + X_i W_i^Q (R_{wi} + R_{hi})^T) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q$, $W_i^K$, $W_i^V$ are linear transformation weight matrices of the each self-attention head, $R_{wi}$, $R_{hi}$ are positional encodings, Concat is the splicing operation, and i=1,2,3,4.

In some embodiments, the processor may use an average precision (AP), a frame per second (FPS), parameters, and floating point operations per second (FLOPs) as performance evaluation metrics, and evaluating accuracy, an identifying speed, parameters quantity, and computational complexity of the identification model by the AP, the FPS, the parameters, and the FLOPs respectively.

The performance evaluation described in step 240 and step 250 uses the AP to evaluate the accuracy of model detection, calculated as follows:

$$P = \frac{TP}{TP + FP},$$

$$R = \frac{TP}{TP + FN},$$

$$AP = \sum_{m=1}^{n-1} (R_{m+1} - R_m) P(R_{m+1}),$$

where TP means that both a test image and a predicted image are images containing the pine wood nematode-infected discolored wood, FP means that the test image does not contain the pine wood nematode-infected discolored wood, and the predicted image contains the pine wood nematode-infected discolored wood, and FN means that the test image contains the pine wood nematode-infected discolored wood, and the predicted image does not contain the pine wood nematode-infected discolored wood, and m denotes an order in which a recall R is generated at the time of evaluation.

In terms of a speed of model detection, the FPS is used for evaluation, and the formula is as follows:

$$FPS = 1/T,$$

where T denotes time taken by the model to process an image.

In terms of model lightweighting, Parameters and FLOPs are used for evaluation. Parameters denote a count of weights and biases to be learned in the model, which directly affects the model's storage consumption, and is computed as follows:

$$\text{Parameters} = C_{out} * (K_h * K_w * C_{in} + 1),$$

where $C_{out}$ denotes a count of output channels, $C_{in}$ is a count of channels of the input feature map, and $K_h$ and $K_w$ are height and width of the convolution kernel, respectively.

FLOPs is an indicator for measuring the computational complexity of the model, which indicates a count of floating-point operations carried out by the model during an inference process, and is used to assess a level of computational resource consumption of the model, which is computed by the following formula:

$$FLOPs = [2 * (K_h * K_w * C_{in}) * C_{out} + C_{out}] * H * W,$$

where $C_{out}$ denotes the count of output channels, H, W and $C_{in}$ are the height, width, and count of channels of the input feature map, respectively, and $K_h$ and $K_w$ are height and width of the convolution kernel, respectively.

The effectiveness of the method for identifying the pine wood nematode-infected discolored wood in the mixed coniferous and broadleaf forest as described in this embodiment is further illustrated by the following comparative experiment.

Figure 5:
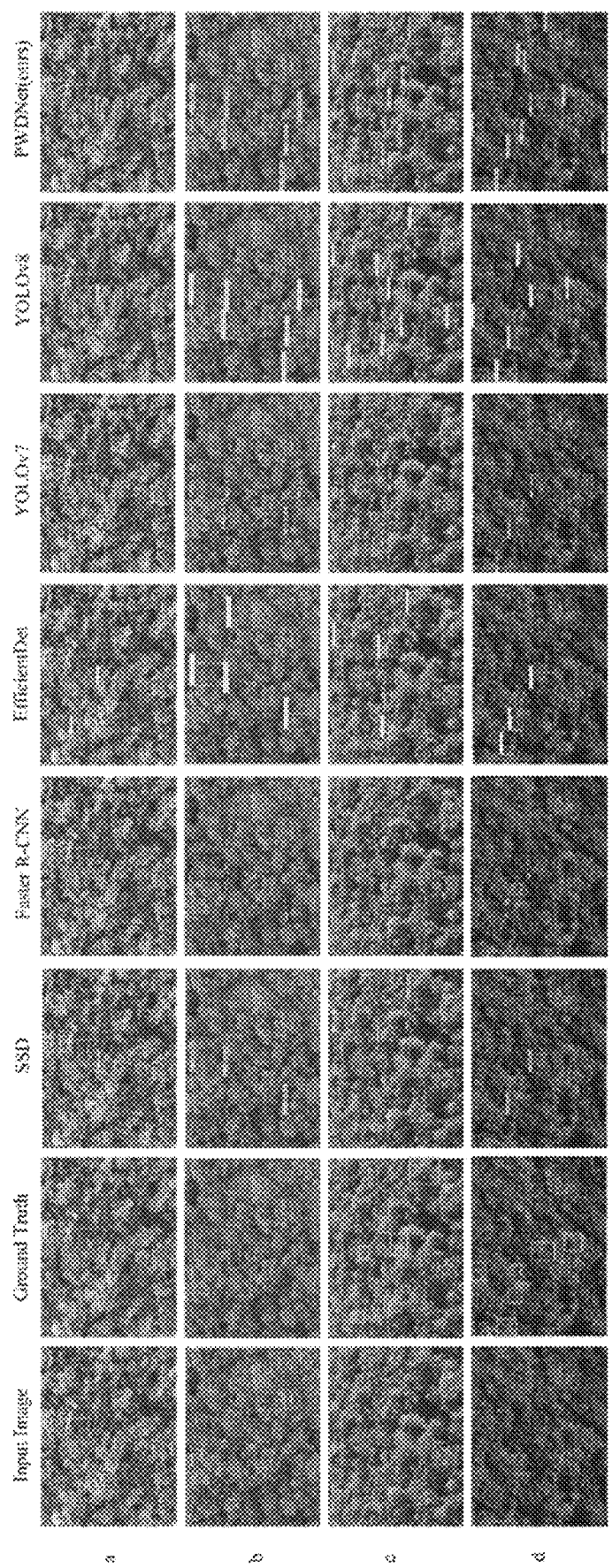
FIG. 5 is a comparison chart of recognition results of an identification model for a pine wood nematode-infected discolored wood according to some embodiments of the present disclosure and other object detection models.

FIG. 5 is a comparison chart of recognition results of an identification model for a pine wood nematode-infected discolored wood according to some embodiments of the present disclosure and other object detection models.

Contrasting experiments were carried out between this embodiment's identification model for the pine wood nematode-infected discolored wood and classical target detection models, including SSD, Faster R-CNN, EfficentDet, YOLOv7, and YOLOv8. Results of experimental data of the contrasting experiments are shown in Table 1, and visualization results are shown in FIG. 5.

TABLE 1

Contrasting Experiment Results of Different Models

| model | $AP_{0.5}$ (%) | Parameters (MB) | FLOPs (G) | FPS |
|---|---|---|---|---|
| SSD | 78.0 | 26.3 | 62.7 | 87 |
| Faster R-CNN | 79.3 | 369.7 | 136.6 | 29 |
| EfficentDet | 82.7 | 103.7 | 25.2 | 20.6 |
| YOLOv7 | 85.6 | 36.4 | 104.7 | 123 |
| YOLOv8 | 86.4 | 28.9 | 28.9 | 110 |
| PWDNet (Model in the present disclosure) | 88.2 | 26.1 | 25.1 | 117 |

Combined with Table 1 and FIG. 5, it can be seen that the identification model disclosed in the present embodiment, i.e., PWDNet, not only achieves 88.2% in terms of detection accuracy, but also has fewer count of model parameters, and at the same time has a high real-time performance, which achieves a balance between speed and accuracy, and outperforms existing target detection models in all aspects.

Some embodiments of the present disclosure provide a method for identifying a pine wood nematode-infected discolored wood in a mixed coniferous and broadleaf forest, including:

inputting a pine forest image of the mixed coniferous and broadleaf forest to be identified into a trained identification model for the pine wood nematode-infected discolored wood to identify the pine wood nematode-infected discolored wood in the mixed coniferous and broadleaf forest.

The trained identification model is improved based on a you Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

A formula for the feature-filtering module is:

$$F' = (\sigma(Conv_1(\delta(Conv_1(Maxpool_c(F))))) + Conv_1(\delta(Conv_1(Avgpool_c(F))))) \otimes F + (\sigma(Conv_3(Concat(Maxpool_s(F), Avgpool_s(F))))) \otimes F,$$

where F' is a feature map of fusion space and channel attention output by the feature-filtering module, F denotes a feature map input to the feature-filtering module, σ is a Sigmoid activation function, $Conv_1$ is a 1×1 convolution operation, and $Conv_3$ is a 3×3 convolution operation, Concat is a splicing operation, δ denotes a Relu activation function, $Avgpool_c$ and $Maxpool_c$ are respectively an average pooling operation and a maximum pooling operation along a channel dimension, $Avgpool_s$ and $Maxpool_s$ are an average pooling operation and a maximum pooling operation along a spatial dimension, and ⊗ denotes element-by-element multiplication.

A formula for the feature-enhancing module is:

$$F_{out} = \delta(BN((y_1 + y_2 + y_3 + f))),$$
$$y_g = \delta(f + DConv(\delta(BN(Conv(f))), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, δ denotes a Relu activation function, j is the null rates corresponding to the plurality of branches and j=3,5,7, DConv denotes a null convolution operation, and k denotes a convolution kernel size.

A formula for the convolution-transformer module based on the MSHA is:

$$MultiHead(X) = Concat(Z_1, Z_2, Z_3, Z_4),$$
$$Z_i = Softmax(X_i W_i^Q (X_i W_i^K)^T + X_i W_i^Q (R_{wi} + R_{hi})^T) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q$, $W_i^K$, $W_i^V$ are linear transformation weight matrices of the each self-attention head, $R_{wi}$, $R_{hi}$ are positional encodings, Concat is the splicing operation, and i=1,2,3,4.

Some embodiments of the present disclosure provide a device for identifying a pine wood nematode-infected discolored wood in a mixed coniferous and broadleaf forest, including an identification module.

The identification module is configured to input a pine forest image of the mixed coniferous and broadleaf forest to be identified into a trained identification model for the pine wood nematode-infected discolored wood to identify the pine wood nematode-infected discolored wood in the mixed coniferous and broadleaf forest.

The trained identification model is improved based on a you Only Look Once version 5 small (YOLOv5s) model by connecting a feature-filtering module after a Neck; constructing a feature-enhancing module to replace a C3 module in a Backbone; constructing a convolution-transformer module based on multi-head self-attention (MSHA) to connect after a last layer of residual units in the Backbone; constructing, by Group Shuffle Convolution (GSConv), a multi-scale feature fusion layer to replace an ordinary convolution in the Neck.

The formula for said feature filtering module is:

$$F' = (\sigma(Conv_1(\delta(Conv_1(Maxpool_c(F))))) + Conv_1(\delta(Conv_1(Avgpool_c(F))))) \otimes F + (\sigma(Conv_3(Concat(Maxpool_s(F), Avgpool_s(F))))) \otimes F,$$

where F' is a feature map of fusion space and channel attention output by the feature-filtering module, F denotes a feature map input to the feature-filtering module, σ is a Sigmoid activation function, $Conv_1$ is a 1×1 convolution operation, and $Conv_3$ is a 3×3 convolution operation, Concat is a splicing operation, δ denotes a Relu activation function, $Avgpool_c$ and $Maxpool_c$ are respectively an average pooling operation and a maximum pooling operation along a channel dimension, $Avgpool_s$ and $Maxpool_s$ are an average pooling operation and a maximum pooling operation along a spatial dimension, and ⊗ denotes element-by-element multiplication.

A formula for the feature-filtering module is:

$$F_{out} = \delta(BN((y_1 + y_2 + y_3 + f))),$$
$$y_g = \delta(f + DConv(\delta(BN(Conv(f))), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, δ denotes a Relu activation function, j is the null rates corresponding to the plurality of branches and j=3,5,7, DConv denotes a null convolution operation, and k denotes a convolution kernel size.

A formula for the convolution-transformer module based on the MSHA is:

$$MultiHead(X) = Concat(Z_1, Z_2, Z_3, Z_4),$$
$$Z_i = Softmax(X_i W_i^Q (X_i W_i^K)^T + X_i W_i^Q (R_{wi} + R_{hi})^T) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q$, $W_i^K$, $W_i^V$ are linear transformation weight matrices of the each self-attention head, $R_{wi}$, $R_{hi}$ are positional encodings, Concat is the splicing operation, and i=1,2,3,4.

Some embodiments of the present disclosure provide a non-transitory computer-readable storage medium storing a computer program, wherein when reading the computer program in the storage medium, a computer implements the method for identifying the pine wood nematode-infected discolored wood in the mixed coniferous and broadleaf forest as described above.

In summary, the present disclosure realizes the accurate identification of the pine wood nematode-infected discolored wood in mixed coniferous and broadleaf forest environments, and improves the identification accuracy and robustness of the network model, and at the same time reduces the count of parameters of the network model, which is easy to deploy and promote.

Those skilled in the art should understand that embodiments of the present disclosure may be provided as methods, systems, or computer program products. Thus, the present disclosure may take the form of a fully hardware embodiment, a fully software embodiment, or an embodiment that combines software and hardware aspects. Further, the present disclosure may take the form of a computer program product implemented on one or more computer-usable storage media (including, but not limited to, disk memory, CD-ROM, optical memory, and the like) that contain computer-usable program code therein.

The present disclosure is described with reference to flowcharts and/or block diagrams of methods, apparatus (systems), and computer program products according to embodiments of the present disclosure. It is to be understood that a combination of each of the flows and/or boxes in the flowchart and/or block diagram, and the flows and/or boxes in the flowchart and/or block diagram, may be implemented by the computer program instructions. These computer program instructions may be provided to a processor of a general-purpose computer, a special-purpose computer, an embedded processor, or other programmable data-processing device to produce a machine such that the instructions executed by the computer or other programmable data processing device's processor executes the instructions to produce a machine for implementing a function specified in one or more processes of a flowchart and/or one or more boxes of a block diagram.

These computer program instructions may also be stored in a computer-readable memory capable of directing a computer or other programmable data-processing device to operate in a particular manner, such that the instructions stored in the computer-readable memory produce an article of manufacture comprising an instruction device that the instruction device implements a function specified in one or more processes of a flowchart and/or one or more boxes of a block diagram.

These computer program instructions may also be loaded onto a computer or other programmable data processing device such that a series of operative steps are performed on the computer or other programmable device to produce computer-implemented processing such that the The instructions executed on the device provide steps for implementing a function specified in one or more processes of a flowchart and/or one or more boxes of a block diagram.

Obviously, a person skilled in the art can make various changes and variations to the present disclosure without departing from the spirit and scope of the present disclosure. In this way, to the extent that these modifications and variations of the present disclosure fall within the scope of the claims of the present invention and their technical equivalents, the present disclosure is intended to encompass these modifications and variations as well.

What is claimed is:

1. A method for identifying a pine wood nematode-infected discolored wood in a mixed coniferous and broadleaf forest, comprising:

inputting a pine forest image of the mixed coniferous and broadleaf forest to be identified into a trained identification model for the pine wood nematode-infected discolored wood to identify the pine wood nematode-infected discolored wood in the mixed coniferous and broadleaf forest, wherein the trained identification model is improved based on a you Only Look Once version 5 small (YOLOv5s) model by:

connecting a feature-filtering module after a Neck;

constructing a feature-enhancing module to replace a C3 module in a Backbone;

constructing a convolution-transformer module based on multi-head self-attention (MSHA) to connect after a last layer of residual units in the Backbone;

constructing, by Group Shuffle Convolution (GSConv), a multi-scale feature fusion layer to replace an ordinary convolution in the Neck, wherein a formula for the feature-filtering module is:

$$F' = (\sigma(Conv_1(\delta(Conv_1(Maxpool_c(F)))) + Conv_1(\delta(Conv_1(Avgpool_c(F)))))) \otimes F + (\sigma(Conv_3(Concat(Maxpool_s(F), Avgpool_s(F))))) \otimes F,$$

where F' is a feature map of fusion space and channel attention output by the feature-filtering module, F denotes a feature map input to the feature-filtering module, σ is a Sigmoid activation function, $Conv_1$ is a 1×1 convolution operation, and $Conv_3$ is a 3×3 convolution operation, Concat is a splicing operation, δ denotes a ReLu activation function, $Avgpool_c$ and $Maxpool_c$ are an average pooling operation and a maximum pooling operation along a channel dimension, $Avgpool_s$ and $Maxpool_s$ are respectively an average pooling operation and a maximum pooling operation along a spatial dimension, and ⊗ denotes element-by-element multiplication, a formula for the feature-enhancing module is:

$$F_{out} = \delta(BN((y_1 + y_2 + y_3 + f))),$$

$$y_g = \delta(f + DConv(\delta(BN(Conv(f))), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, δ denotes a ReLu activation function, j is the null rates corresponding to the plurality of branches and j=3,5,7, DConv denotes a null convolution operation, and k denotes a convolution kernel size;

a formula for the convolution-transformer module based on the MSHA is:

$$MultiHead(X) = Concat(Z_1, Z_2, Z_3, Z_4),$$

$$Z_i = Softmax(X_iW_i^Q(X_iW_i^K)^T + X_iW_i^Q(R_{wi} + R_{hi})^T)X_iW_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q, W_i^K, W_i^V$ are linear transformation weight matrices of the each self-attention head, $R_{wi}, R_{hi}$ are positional encodings, Concat is the splicing operation, and i=1,2,3,4.

2. The method of claim 1, wherein the trained identification model is deployed on a drone or a forest area monitoring device, the drone is equipped with a visible light camera, the drone or the forest area monitoring device obtains the pine forest image of the mixed coniferous and broadleaf forest to be identified and inputs the pine forest image into the trained identification model to identify the pine wood nematode-infected discolored wood in the mixed coniferous and broadleaf forest.

3. The method of claim 1, wherein the trained identification model is obtained by:
  obtaining RGB images of pine wood nematode-infected discolored wood at different infection stages in the mixed coniferous and broadleaf forest;
  preprocessing the RGB images;
  dividing the preprocessed images into a training set, a validation set, and a test set in accordance with a set ratio;
  labeling images in the training set, the validation set, and the test set using a LableImg tool, labeling the pine wood nematode-infected discolored wood using rectangular boxes, noting the labeled pine wood nematode-infected discolored wood as a label and storing;
  inputting the images in the training set into an identification model for training, in the training process, learning features of the label, evaluating performance and adjusting hyper-parameters of the identification model using the validation set, obtaining an identification model after adjustment of model weights;
  testing and evaluating performance of the identification model after the adjustment of the model weights using the test set, passing the testing, and obtaining the trained identification model.

4. The method of claim 3, wherein the infection stages include an infection early stage and an infection middle stage, and the evaluating performance of the identification model after the adjustment of the model weights includes:
  using an average precision (AP), a frame per second (FPS), parameters, and floating point operations per second (FLOPs) as performance evaluation metrics, and evaluating accuracy, an identifying speed, parameters quantity, and computational complexity of the identification model by the AP, the FPS, the parameters, and the FLOPs respectively.

5. An electronic device comprising a memory, a processor, and a computer program stored in the memory and runnable on the processor, wherein the processor executes the computer program to realize the method of claim 1.

6. A non-transitory computer-readable storage medium storing a computer program, wherein when reading the computer program in the storage medium, a computer implements the method of claim 1.

7. A device for identifying a pine wood nematode-infected discolored wood in a mixed coniferous and broadleaf forest, comprising:
  an identification module configured to input a pine forest image of the mixed coniferous and broadleaf forest to be identified into a trained identification model for the pine wood nematode-infected discolored wood to identify the pine wood nematode-infected discolored wood in the mixed coniferous and broadleaf forest, wherein the trained identification model is improved based on a you Only Look Once version 5 small (YOLOv5s) model by:
  connecting a feature-filtering module after a Neck;
  constructing a feature-enhancing module to replace a C3 module in a Backbone;
  constructing a convolution-transformer module based on multi-head self-attention (MSHA) to connect after a last layer of residual units in the Backbone;
  constructing, by Group Shuffle Convolution (GSConv), a multi-scale feature fusion layer to replace an ordinary convolution in the Neck, wherein;
a formula for the feature-filtering module is:

$$F' = (\sigma(Conv_1(\delta(Conv_1(Maxpool_c(F)))) + Conv_1(\delta(Conv_1(Avgpool_c(F)))))) \otimes$$
$$F + (\sigma(Conv_3(Concat(Maxpool_s(F), Avgpool_s(F))))) \otimes F,$$

where F' is a feature map of fusion space and channel attention output by the feature-filtering module, F denotes a feature map input to the feature-filtering module, $\sigma$ is a Sigmoid activation function, $Conv_1$ is a 1×1 convolution operation, and $Conv_3$ is a 3×3 convolution operation, Concat is a splicing operation, $\delta$ denotes a Relu activation function, $Avgpool_c$ and $Maxpool_c$ are respectively an average pooling operation and a maximum pooling operation along a channel dimension, $Avgpool_s$ and $Maxpool_s$ are an average pooling operation and a maximum pooling operation along a spatial dimension, and $\otimes$ denotes element-by-element multiplication;
a formula for the feature-enhancing module is:

$$F_{out} = \delta(BN((y_1 + y_2 + y_3 + f))),$$
$$y_g = \delta(f + DConv(\delta(BN(Conv(f)), j, k)),$$

where $F_{out}$ is a feature map output by the feature-enhancing module, f is a feature map input to the feature-enhancing module, $y_g$ is a null convolution output of a plurality of branches with different null rates and g=1,2,3, BN is a Batch Norm normalization operation, $\delta$ denotes a Relu activation function, j is the null rates corresponding to the plurality of branches and j=3,5,7, DConv denotes a null convolution operation, and k denotes a convolution kernel size;
a formula for the convolution-transformer module based on the MSHA is:

$$MultiHead(X) = Concat(Z_1, Z_2, Z_3, Z_4),$$
$$Z_i = Softmax(X_i W_i^Q (X_i W_i^K)^T + X_i W_i^Q (R_{wi} + R_{hi})^T) X_i W_i^V,$$

where MultiHead(X) is a feature output of the convolution-transformer module based on the MSHA, $Z_i$ is an output of each self-attention head, $X_i$ is a part of a feature X inputted into the convolution-transformer module based on the MSHA, $W_i^Q, W_i^K, W_i^V$ are linear transformation weight matrices of the each self-attention head, $R_{wi}, R_{hi}$ are positional encodings, Concat is the splicing operation, and i=1,2,3,4.

* * * * *